(No Model.)

S. KENNEDY.
AUTOMATIC BRAKE FOR WAGONS AND CARRIAGES.

No. 326,658. Patented Sept. 22, 1885.

Witnesses:
A. P. Kennedy
Martha A. Kennedy

Inventor
Sylvester Kennedy

UNITED STATES PATENT OFFICE.

SYLVESTER KENNEDY, OF GAP, PENNSYLVANIA.

AUTOMATIC BRAKE FOR WAGONS AND CARRIAGES.

SPECIFICATION forming part of Letters Patent No. 326,658, dated September 22, 1885.

Application filed March 21, 1885. (No model.)

*To all whom it may concern:*

Be it known that I, SYLVESTER KENNEDY, a citizen of the United States, residing at Gap, in the county of Lancaster and State of Pennsylvania, have invented certain new and useful Improvements in Brakes for Wagons and Carriages, of which the following is a description.

The nature of my invention consists in an automatic or self-acting brake for either wagons or carriages, and is adapted to and may be used on any four-wheeled vehicle, whether with or without springs, the plan and working of which are fully set forth in the annexed specification and drawings.

Figure 1:
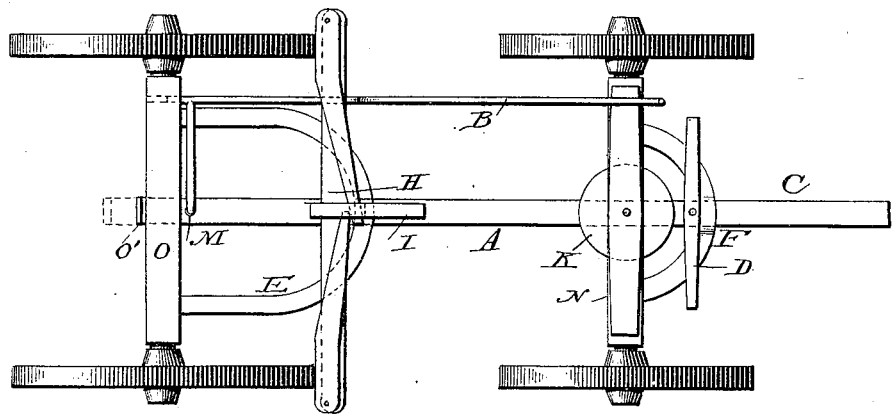
Figure 2:
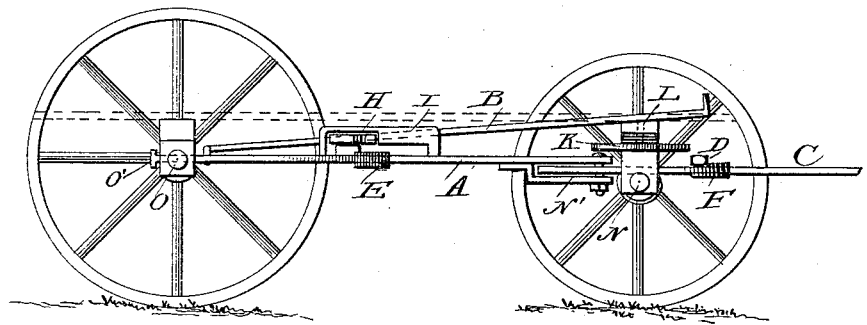
Figure 3:
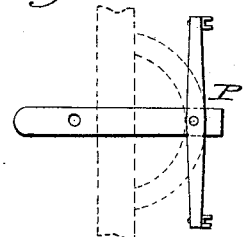

Figure 1 is a plan top view; Fig. 2, a side view; and Fig. 3, a short tongue, with shaft-bar attached, to be inserted in place of long tongue to be used for one horse.

A represents the reach; B, the lever to prevent the brake from acting when backing; C, tongue; D, double-tree; E, hind hounds, connected by plates above and below, through which the reach slides; F, the front hounds and same connection through which the tongue passes; H, the brake-lever; I, the staple attached to the reach, in which the brake-lever acts to force the brakes against the wheels; K, the swivel allowing the body freedom to act in turning; L, the bolster, to which the swivel is attached; M, a hole in the reach, into which the lever B can be made to drop in backing. N' is the clevis, into which the tongue is connected by a bolt through both. N represents the axle; O', the back part of the reach, enlarged so as to form draft at hind axle; P, the shaft-bar on short tongue for fastening shafts to.

In my invention the tongue and reach slide through the hounds both front and back, and also the axle, or between the bolsters and axles, and not rigidly connected to either, the only connection being the tongue being bolted in the front part of the clevis in the reach. There being no hounds behind the front axle to sustain a slider to keep up the tongue, this clevis is so constructed as to act as a slide to keep up the tongue, and at the same time prevent the brake from drawing down the reach, as it would do in any other coupling behind the axle. The tongue being loose, the draft is by the clevis coming against the front axle and bolster; also from the enlargement of reach behind the rear axle and bolster at the same time, thus differing from a rigid tongue, where the draft is all from the hounds and king-bolt. Having neither king-bolt nor pivot, and the body rigidly fastened to the front bolster and hind axle, a swivel is used on the front axle for turning.

By my arrangement of brakes a much greater leverage is made against the wheels than that in common use.

Having a rigid connection of the body both to the front bolster and hind axle and no rollers, the invention is as well designed for spring-carriages as for heavy or light wagons.

In operating my invention on descending ground the tongue and reach slide through both front and back axles and bolsters and force the brakes against the wheels, and as the descent lessens the brakes are drawn off and the draft commences. If necessary to back the wagon, turn the lever B into the hole M; then to go forward, turn the lever back to its place. In a carriage this may be done by the foot at the foot-rest.

Having thus fully described my invention, what I claim as new, and desire to secure by Letters Patent, is—

1. A sliding tongue and reach passing through both axles, or between axles and bolsters, and connected together by a bolt through clevis and tongue immediately behind the front axle, this clevis being of sufficient length to act as a slider, and at the same time to form a draft against the front axle, this reach being also enlarged behind the rear axle, so as to form a draft against the rear axle, having draft both against the front and rear axles.

2. A staple in the reach to force back the brakes against the wheels.

SYLVESTER KENNEDY.

Witnesses:
 A. P. KENNEDY,
 HENRY FOX.